US010417260B2

United States Patent
Kikin-Gil et al.

(10) Patent No.: US 10,417,260 B2
(45) Date of Patent: *Sep. 17, 2019

(54) HASH TAG MANAGEMENT IN A MICROBLOGGING INFRASTRUCTURE

(71) Applicant: MICROSOFT TECHNOLOGY LICENSING, LLC, Redmond, WA (US)

(72) Inventors: Ruth Kikin-Gil, Redmond, WA (US); Cedric P. Dussud, Seattle, WA (US); Hai Liu, Sammamish, WA (US); Anne Archambault, Redmond, WA (US); John Griffin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,074

(22) Filed: Aug. 15, 2016

(65) Prior Publication Data
US 2016/0350398 A1 Dec. 1, 2016

Related U.S. Application Data

(63) Continuation of application No. 12/970,966, filed on Dec. 17, 2010, now Pat. No. 9,418,160.

(51) Int. Cl.
*G06F 16/28* (2019.01)
*G06Q 50/00* (2012.01)
(Continued)

(52) U.S. Cl.
CPC ............ *G06F 16/285* (2019.01); *G06F 16/23* (2019.01); *G06F 16/9535* (2019.01);
(Continued)

(58) Field of Classification Search
CPC ............................ H04L 12/5895; H04L 29/06
See application file for complete search history.

(56) References Cited

U.S. PATENT DOCUMENTS

| 7,590,691 | B2 | 9/2009 | Gonsalves et al. |
| 7,669,123 | B2 * | 2/2010 | Zuckerberg ........... H04L 67/306 715/273 |

(Continued)

FOREIGN PATENT DOCUMENTS

| CN | 101262494 A | 9/2008 |
| CN | 101351796 A | 9/2008 |
| CN | 101903874 A | 12/2010 |

OTHER PUBLICATIONS

"An Introduction to Twitter Hashtags", Retrieved at <<http://www.wildapricot.com/blogs/newsblog/archive/2008/03/11/an-introduction-to-twitter-hashtags.aspx>>, Mar. 11, 2008, pp. 16.
(Continued)

*Primary Examiner* — Backhean Tiv

(57) ABSTRACT

Architecture that provides enhanced tag telemetry in a microblogging communications infrastructure. The architecture provides efficient discovery and tracking of topics that are of interest to a specific user by enabling users to follow (track) hash tags (#tag) and to receive and view all messages tagged with the hash tag appear in the user's personal feed. Each hash tag has a persisted tag page that aggregates all the associated activity, and includes a list that includes, but is not limited to, the tag followers, the most frequent user (uses the tag the most often in a specific time frame), a description, related tags, for example. The user can receive all the updates in the user's personal feed, and see an aggregation of all the messages and conversations associated with the tag in single place. The user can also mute the tag to prevent the receiving of tag information.

20 Claims, 9 Drawing Sheets

(51) Int. Cl.
  *G06F 16/23* (2019.01)
  *G06F 16/9535* (2019.01)
  *H04L 29/08* (2006.01)
(52) U.S. Cl.
  CPC .............. *G06Q 50/01* (2013.01); *H04L 67/02* (2013.01); *H04L 67/10* (2013.01); *H04L 67/22* (2013.01)

(56) References Cited

U.S. PATENT DOCUMENTS

| | | | | |
|---|---|---|---|---|
| 7,725,492 B2* | 5/2010 | Sittig | .................... | G06Q 10/00 707/784 |
| 7,827,208 B2* | 11/2010 | Bosworth | ............... | H04L 67/22 707/802 |
| 7,945,653 B2* | 5/2011 | Zuckerberg | ............. | G06F 16/58 709/223 |
| 9,009,162 B1* | 4/2015 | Luo | ......................... | G06F 16/31 707/740 |
| 9,110,953 B2* | 8/2015 | Steinberg | ............. | H04N 21/454 |
| 9,166,935 B1* | 10/2015 | Dodsworth | ............ | G06Q 10/10 |
| 9,418,160 B2* | 8/2016 | Kikin-Gil | .............. | G06Q 50/01 |
| 9,722,807 B2* | 8/2017 | Jorasch | ............... | H04L 12/1813 |
| 2007/0083894 A1 | 4/2007 | Gonsalves et al. | | |
| 2009/0157650 A1* | 6/2009 | Chow | .................... | G06F 16/972 |
| 2009/0164897 A1 | 6/2009 | Amer-Yahia et al. | | |
| 2009/0287646 A1* | 11/2009 | Maciocci | ............. | G06F 16/957 |
| 2010/0064007 A1* | 3/2010 | Randall | .................. | G06Q 30/02 709/204 |
| 2010/0064015 A1* | 3/2010 | Sacks | ..................... | G06Q 10/10 709/206 |
| 2010/0161599 A1* | 6/2010 | Daughtry | ................. | B04B 15/02 707/736 |
| 2010/0179915 A1 | 7/2010 | Nastacio | | |
| 2010/0211868 A1* | 8/2010 | Karmarkar | ........ | H04M 1/72547 715/234 |
| 2010/0280860 A1* | 11/2010 | Iskold | .................... | G06Q 10/00 705/319 |
| 2011/0010424 A1* | 1/2011 | Fox | ........................ | G06F 16/489 709/206 |
| 2011/0029503 A1* | 2/2011 | Kalaboukis | ........... | G06F 16/951 707/709 |
| 2011/0179020 A1* | 7/2011 | Ozzie | .................... | G06F 16/958 707/723 |
| 2011/0179434 A1* | 7/2011 | Jorg | ........................ | G06Q 30/06 725/1 |
| 2011/0231296 A1* | 9/2011 | Gross | ..................... | G06Q 10/10 705/37 |
| 2011/0282947 A1* | 11/2011 | Dodson | .................. | G06Q 10/10 709/206 |
| 2011/0291860 A1* | 12/2011 | Ozaki | ............... | G01C 21/3694 340/905 |
| 2012/0041953 A1 | 2/2012 | Dumais et al. | | |
| 2012/0042022 A1* | 2/2012 | Sheth | ....................... | H04L 51/32 709/206 |
| 2012/0066212 A1* | 3/2012 | Jennings | ................. | H04L 67/22 707/723 |
| 2012/0072835 A1* | 3/2012 | Gross | ..................... | G06Q 10/10 715/243 |
| 2012/0117059 A1* | 5/2012 | Bailey | ................. | G06F 16/9535 707/723 |
| 2012/0131139 A1* | 5/2012 | Siripurapu | ............ | G06F 16/951 709/217 |
| 2012/0136929 A1* | 5/2012 | Li | ......................... | G06Q 10/101 709/203 |
| 2012/0151381 A1* | 6/2012 | Schiff | ....................... | G06F 8/34 715/752 |
| 2012/0158863 A1* | 6/2012 | Kikin-Gil | ............ | G06Q 50/01 709/206 |
| 2012/0210247 A1* | 8/2012 | Khouri | ................. | G06Q 10/101 715/751 |
| 2013/0132828 A1* | 5/2013 | Qu | ........................ | G06F 17/211 715/243 |
| 2014/0012769 A1* | 1/2014 | Wang | .................. | G06Q 30/0224 705/319 |
| 2014/0019615 A1* | 1/2014 | Jennings | .................. | H04L 67/22 709/224 |
| 2014/0040042 A1* | 2/2014 | Schoen | ................... | G06Q 10/10 705/14.66 |
| 2014/0040300 A1* | 2/2014 | Narayanan | .............. | H04W 4/21 707/758 |
| 2014/0040371 A1* | 2/2014 | Gurevich | ................ | H04W 4/21 709/204 |
| 2014/0222835 A1* | 8/2014 | Lee | .................... | G06F 16/24534 707/748 |
| 2014/0304622 A1* | 10/2014 | Jorasch | ............... | H04L 12/1813 715/753 |
| 2015/0067057 A1* | 3/2015 | Brekke | .................... | H04L 67/02 709/204 |
| 2015/0149153 A1* | 5/2015 | Werth | ................. | G06F 17/2785 704/9 |
| 2016/0350398 A1* | 12/2016 | Kikin-Gil | ............. | G06Q 50/01 |
| 2017/0169495 A1* | 6/2017 | Rathus | .................... | G06F 21/36 |

OTHER PUBLICATIONS

"Hashtags on Twitter: How do you follow them?", Retrieved at <<http://www.contentious.com/2009/03/08/hashtags-on-twitter-how-do-you-follow-them/>>, Mar. 8, 2009, pp. 9.

"Knowledge Sharing Tools and Methods Toolkit—Microblogging", Retrieved at <<http://www.kstoolkit.org/ Microblogging>>, Retrieved Date: Oct. 6, 2010, pp. 8.

"Mashups Tag Search: haiku", Retrieved at <<http://www.programmableweb.com/tag/haiku>>, Retrieved Date: Oct. 6, 2010, pp. 4.

Albright et al., "Listening to the Twitter Conversation", Retrieved at <<http://support.sas.com/resources/papers/proceedings10/355-2010.pdf>>, Mar. 2010, pp. 1-8.

Efron, Miles, "Hashtag Retrieval in a Microblogging Environment", Retrieved at <<http://59.108.48.12/proceedings/ sigir/sigir2010/docs/p787.pdf>>, The 33rd International ACM SIGIR conference on research and development in Information Retrieval, Jul. 19-23, 2010, pp. 787-788.

Office Action from the State Intellectual Property Office of the People's Republic of China regarding Application No. 201110443450.4 dated Feb. 28, 2014, 12 pages.

Second Office Action regarding Chinese Patent Application No. 201110443450.4, dated Jul. 23, 2014, 6 pages.

Siegler, MG., "TweetBeat Wants to Kill Hashtags on Twitter by Making Them Obsolete", Retrieved at <<http:// techcrunch.com/2010/09/29/tweetbeat/>>, Sep. 29, 2010, pp. 8.

U.S. Appl. No. 12/970,966, Final Office Action Issued in U.S. Appl. No. 12/970,966, dated Jan. 17, 2014, 23 Pages.

U.S. Appl. No. 12/970,966, Non Final Office Action Issued in U.S. Appl. No. 12/970,966, dated Sep. 3, 2014, 34 Pages.

U.S. Appl. No. 12/970,966, Non Final Office Action Issued in U.S. Appl. No. 12/970,966, dated Sep. 29, 2015, 42 Pages.

U.S. Appl. No. 12/970,966, Non Final Office Action Issued in U.S. Appl. No. 12/970,966, dated Jun. 28, 2013, 14 Pages.

U.S. Appl. No. 12/970,966, Notice of Allowance Issued in U.S. Appl. No. 12/970,966, dated Jan. 13, 2015, 16 Pages.

U.S. Appl. No. 12/970,966, Notice of Allowance Issued in U.S. Appl. No. 12/970,966, dated Apr. 19, 2016, 15 Pages.

Chinese Notice of Allowance Issued in Chinese Patent Application No. 201110443450.4, dated Dec. 4, 2014, 4 Pages.

Efron, Miles, "Hashtag Retrieval in a Microblogging Environment", Retrieved from: http://citeseerx.ist.psu.edu/viewdoc/download?doi=10.1.1.372.5333&rep=rep1&type=pdf, Jul. 19, 2010, 2 Pages.

Muller, "Enterprise Microblogging for Advanced Knowledge Sharing: The References@BT Case Study", Retrieved from: https://mueller24.info/pub/11mue1.pdf, Jul. 19, 2010, 16 Pages.

* cited by examiner

HASH TAG MANAGEMENT IN A MICROBLOGGING INFRASTRUCTURE

RELATED APPLICATIONS

This application is a continuation of U.S. patent application Ser. No. 12/970,966 (now U.S. Pat. No. 9,418,160), filed Dec. 17, 2010, and entitled "Hash Tag Management in a Microblogging Infrastructure," which is hereby incorporated by reference.

BACKGROUND

It is difficult for users to find information in a microblog feed that relates to topics of interest. Microblogging differs from blogging in that content is typically smaller than that utilized in blogging. Thus, users are not tasked with the time to read larger blog type messages of hundreds of words. For example, a microblog message may consist of nothing more than a sentence fragment, or an image, for example, in contrast to blog messages that typically contain more content. Moreover, the microblog message content is smaller in size and overall file size is typically much smaller than blog messages.

Existing microblog infrastructures are limited; for example, when the user finds such a topic of interest, it is then further difficult to receive updates about the latest posts and discussions related to the topic. Thus, in order to track all the conversations (messages) about the topic the user has to either continually search for that topic or read every message in the feed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides enhanced tag management in a microblogging communications infrastructure. The architecture provides efficient discovery and tracking of topics that are of interest to a specific user by enabling users to follow (track) hash (#) tags (denoted as #tag) and to receive and view all messages tagged (or associated) with the hash tag in the user's personal feed. Each hash tag has a persisted tag page that aggregates all the associated activity, and includes a list that includes, but is not limited to, the tag followers, the most frequent user (uses the tag the most often in a specific time frame), a description, and related tags, for example. Following the tag and dedicating a page to a specific topic (#tag) enables the user to receive all the updates in the user's personal feed, and to see an aggregation of all the messages and conversations associated with the tag in single place (on the tag page). The user can also mute the tag to prevent the receipt of tag information (e.g., content associated with the tag) via a feed (e.g., personal).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
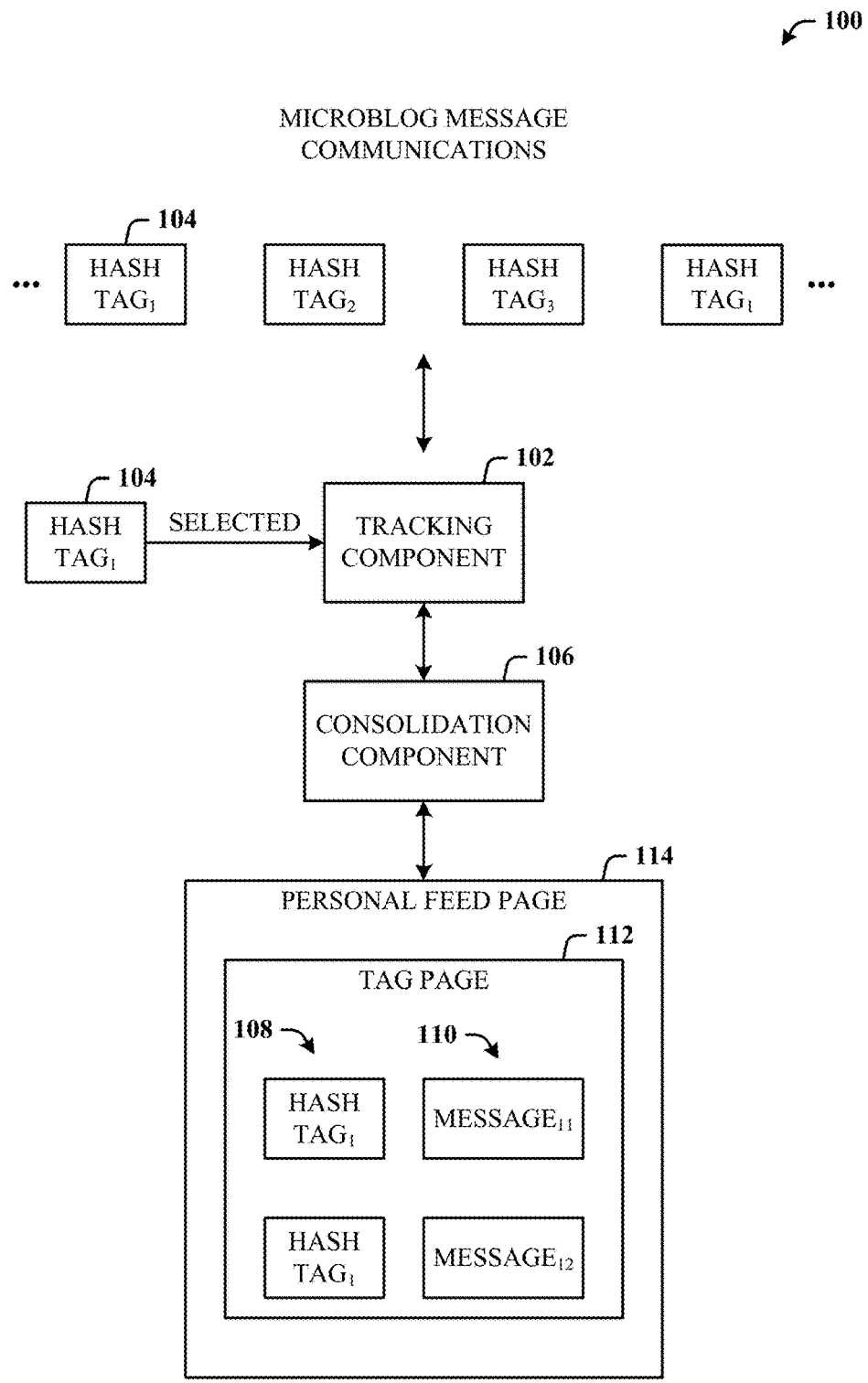
FIG. 1 illustrates a computer-implemented information system in accordance with the disclosed architecture.

Microblogging is an efficient tool for short and brief communications of conversation and the like. The disclosed architecture provides the capability to select and follow a tag, and receive messages associated with the tag (e.g., having an embedded tag) via the user's personal feed. Users can follow tags of interest, and see messages that contain this tag in the personal feed (a user-specific data pipe via which information is communicated) thereby enabling users to stay apprised of the latest activities and news around that topic. Moreover, the user can enrich the tag with metadata such as description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented information system 100 in accordance with the disclosed architecture. The system 100 includes a tracking component 102 of a microblog platform that tracks a hash tag 104 as selected by a user. The hash tag 104 can be embedded in microblog messages. The system 100 can also comprise a consolidation component 106 of the microblog platform that consolidates instances 108 of the hash tag 104 and associated microblog messages 110 as a tag page 112 and provides access to the tag page 112 based on any instance of the hash tag in the microblog communications infrastructure (e.g., via a personal feed page 114 of the user). Note that access to the tag page 112 can be from any mention of the #tag. For example, access can be from mentioning of the hash tag in the user's personal feed, from a message in the company feed, from search results, from a page that contains a list of tags a user follows, etc. Moreover, when a user creates a tag in a message, a page is automatically generated for that tag, and any user can follow the tag from that point forward.

The tag page 112 can include messages associated with the hash tag 104. The tag page 112 can also include at least one of a list of tag followers, a description, related hash tags, or identity of a tag user. The tag user can be included on the tag page 112 based on usage frequency of the hash tag 104 by the tag user. The hash tag 104 is associated with metadata added by the user. The personal feed page 114 receives all microblog messages associated with the hash tag 104. The hash tag 104 can be muted to prevent reception of associated microblog messages via the personal feed page 114.

The hash tag 104 can be followed from a message in the personal feed page 114 or any mention (instance) of the hash tag in the system (e.g., microblogging infrastructure). When the user chooses to follow (track) a particular hash tag, then all messages that include the hash tag will appear in the user's feed. The hash tag 104 can be searched from the personal feed page 114 and tracked for all instances by the tracking component 102.

Figure 2:
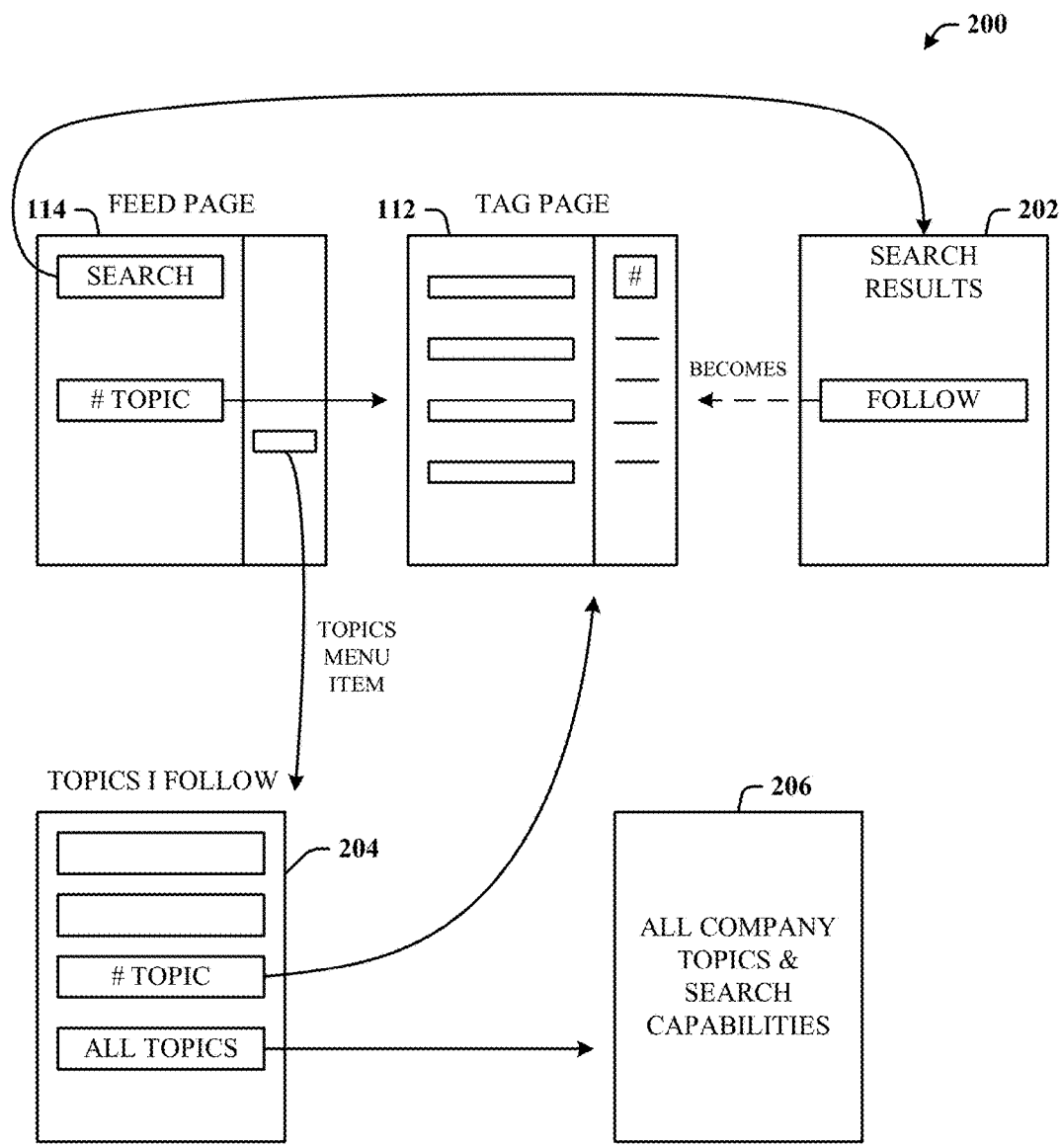
FIG. 2 illustrates interactive flow between aspects of an information system that employs tag telemetry in a microblogging platform.

FIG. 2 illustrates interactive flow between aspects of an information system 200 that employs tag telemetry in a microblogging platform. The system 200 includes the feed page 114 from which a search can be performed. The search results 202 list tags, one or more of which can be selected for following (tracking). In response, the tag page 112 is created for the selected tag and all instances of the tag currently in use are presented on the tag page 112. Additionally, updates to the tag can also be discovered and tracked on the tag page 112. The feed page 114 also provides a selectable link to the tag page 112 for a more comprehensive review of the tag instances, metadata, and associated microblog messages. The feed page 114 can also include a link (denoted Topics Menu Item) that navigates the user to all the topics the user chooses to follow (referred to as the topics page 204).

If the user chooses to track a new topic (identified as the hash tag followed by the topic (e.g., one or more descriptive and identifying words)), the selected new topic can be added to the user's topics page 204. The topics page 204 can also include a pointer (or link) to all topics in the company 206 (and search capabilities). Thus, there can be not only the personal feed page, but a company feed page 206, which includes all topics and tags of the company. Thus, the topics page 204 can further comprise an all topics link that points to the company feed page 206 which includes all the topics and tags. The topics page 204 can also include a link or navigation back to the user's tag page 112. The user's topic page 204 can include a mixture of people and tags.

Figure 3:
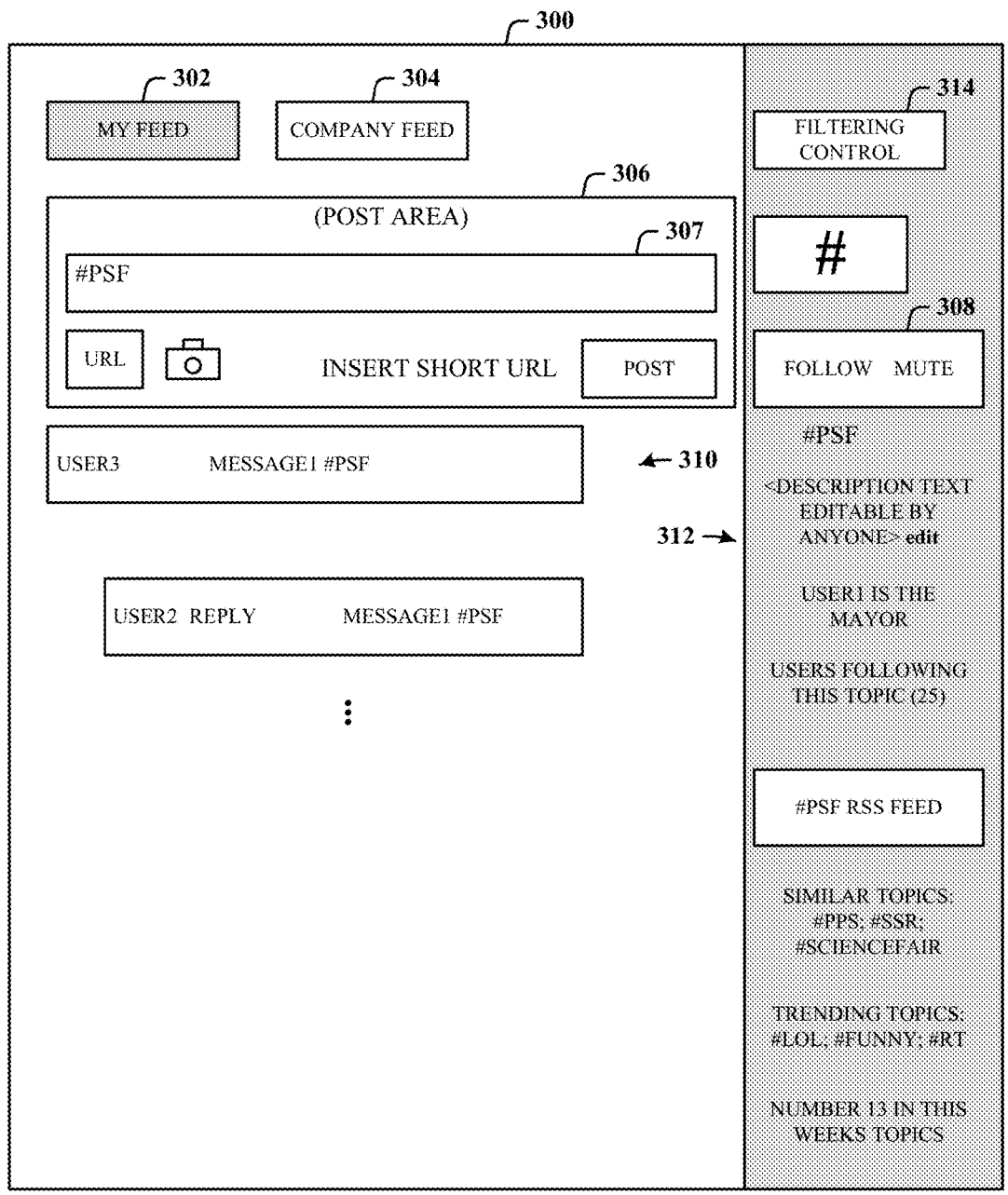
FIG. 3 illustrates a tag page for tag management.

FIG. 3 illustrates a tag page 300 for tag telemetry. The tag page includes selectable controls for a personal feed 302 and a company feed 304. Here, the user is interested in the microblog information for the personal feed 302. A post area 306 allows for entering text as a message to others. The post area 306 also enables the user to enter a URL (uniform resource locator), if desired, as well as other media such as an image, for example. The post area 306 provides the capability to insert or associate URLs, and other media such as image file and/or video files (using the camera icon control), for example. Additionally, the hash tag (here, #psf) automatically appears in the post area box 307 thereby obviating the need for manual entry by the user.

A tag control 308 allows the user to select the hash tag for following and/or muting. Here, in this example usage of a hash tag having an arbitrary name of "psf", the hash tag #psf is being followed, along with all messages communicated with the #psf hash tag. A message area 310 shows the messages associated with the selected hash tag (#psf).

An informational area 312 provides status information. For example, the user identified as the mayor is presented. Other information presented include the number of users following the selected hash tag (#psf), topics deemed similar to the hash tag, the rank of the hash tag for a given period of time (e.g., one week), trending topics, and RSS (really simple syndication) feed information.

A filtering control 314 can also be provided that when selected exposes a filtering dialog to allow filtering based on criteria such as most popular, just added, by alphanumeric characters (e.g., a-z, 0-9, special characters, etc.), and attachments, dates, user, and so on.

Figure 4:
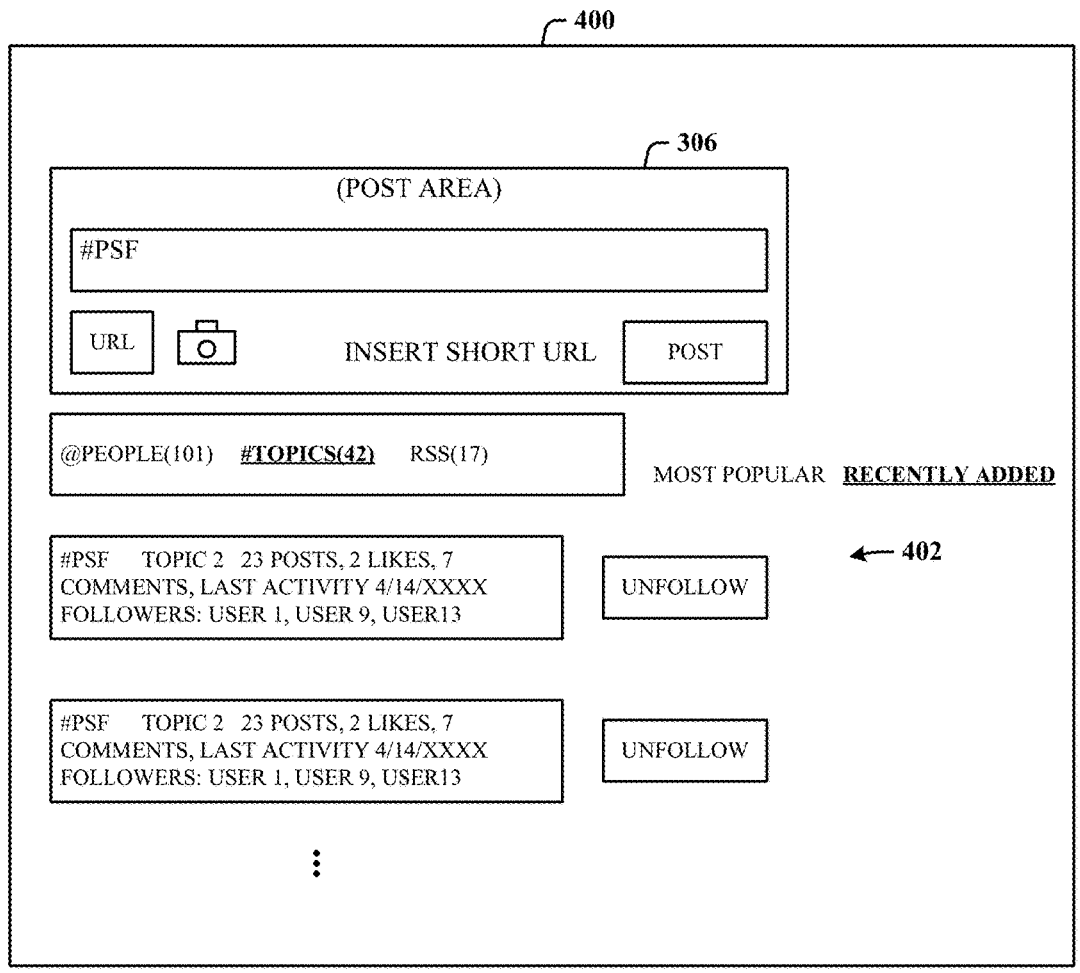
FIG. 4 illustrates a follow page for tag management.

FIG. 4 illustrates a follow page 400 for tag telemetry. The follow page 400 presents the hash tags that a user has or can select to follow (or track). The follow page 400 can include the post area 306, a listing of topics to follow or unfollow. As depicted, the follow page 400 enables the user to view the RSS feeds, most popular topics, and the recently added topics.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
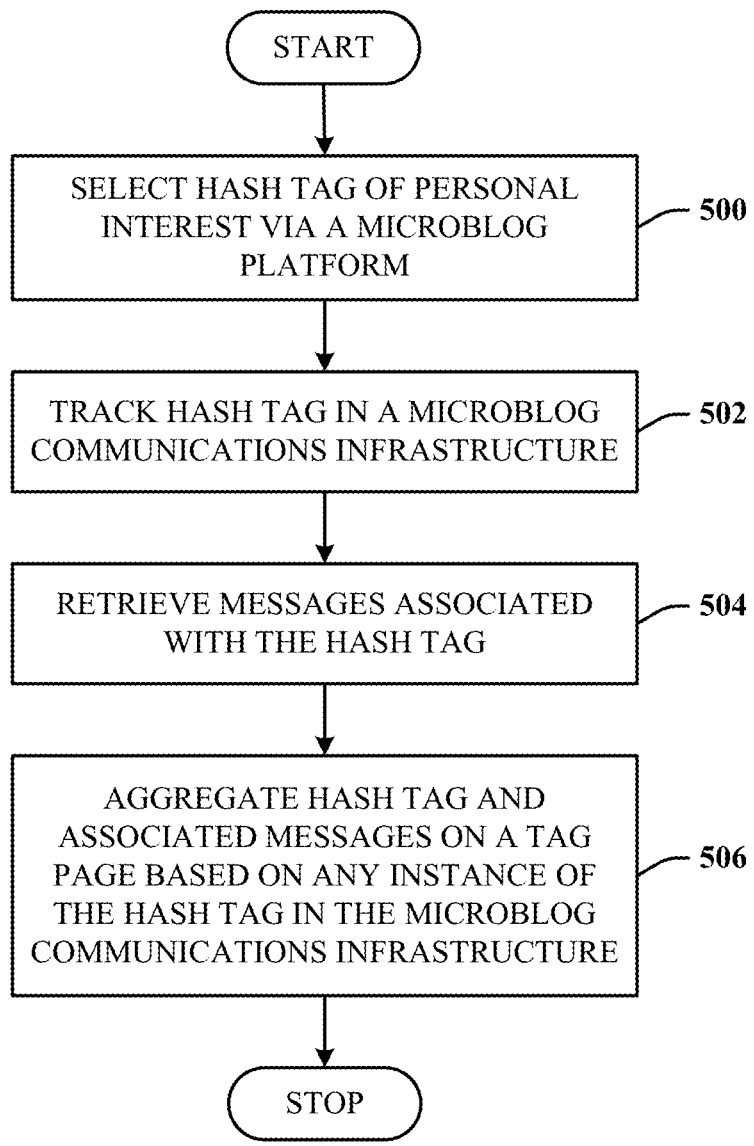
FIG. 5 illustrates a computer-implemented information method in accordance with the disclosed architecture.

FIG. 5 illustrates a computer-implemented information method in accordance with the disclosed architecture. At 500, a hash tag of personal interest is selected via a microblog platform. At 502, the hash tag is tracked in a microblog communications infrastructure. At 504, messages associated with the hash tag are received. At 506, the hash tag and associated messages are aggregated on a tag page based on any instance of the hash tag in the microblog communications infrastructure.

Figure 6:
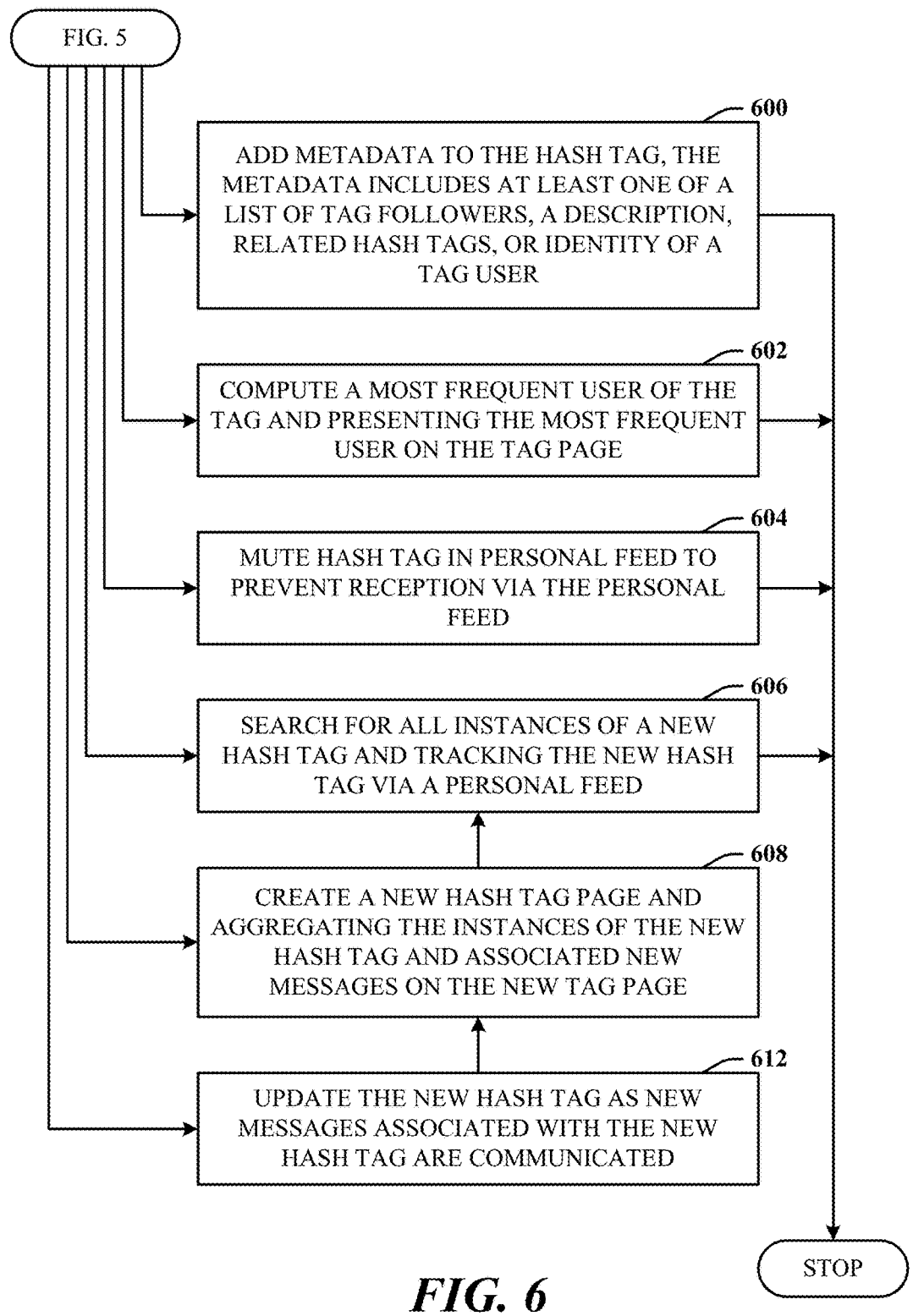
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, metadata is added to the hash tag, the metadata includes at least one of a list of tag followers, a description, related hash tags, or identity of a tag user. At 602, a most frequent user of the tag is computed and the most frequent user is presented on the tag page. At 604, the hash tag can be muted to prevent reception via the personal feed. Note however, although the tag will not show on the user's feed, the user can go to the tag page and be updated with all the new messages related to the hash tag. The company feed still receives all instances and associated messages. Thus, muting the hash tag does not affect the tag page. At 606, for all instances of a new hash tag are searched and the new hash tag is tracked via the personal feed. At 608, a new hash tag page is created and the instances of the new hash tag and associated new messages are aggregated on the new tag page. At 610, the new hash tag is updated as new messages associated with the new hash tag are communicated.

Figure 7:
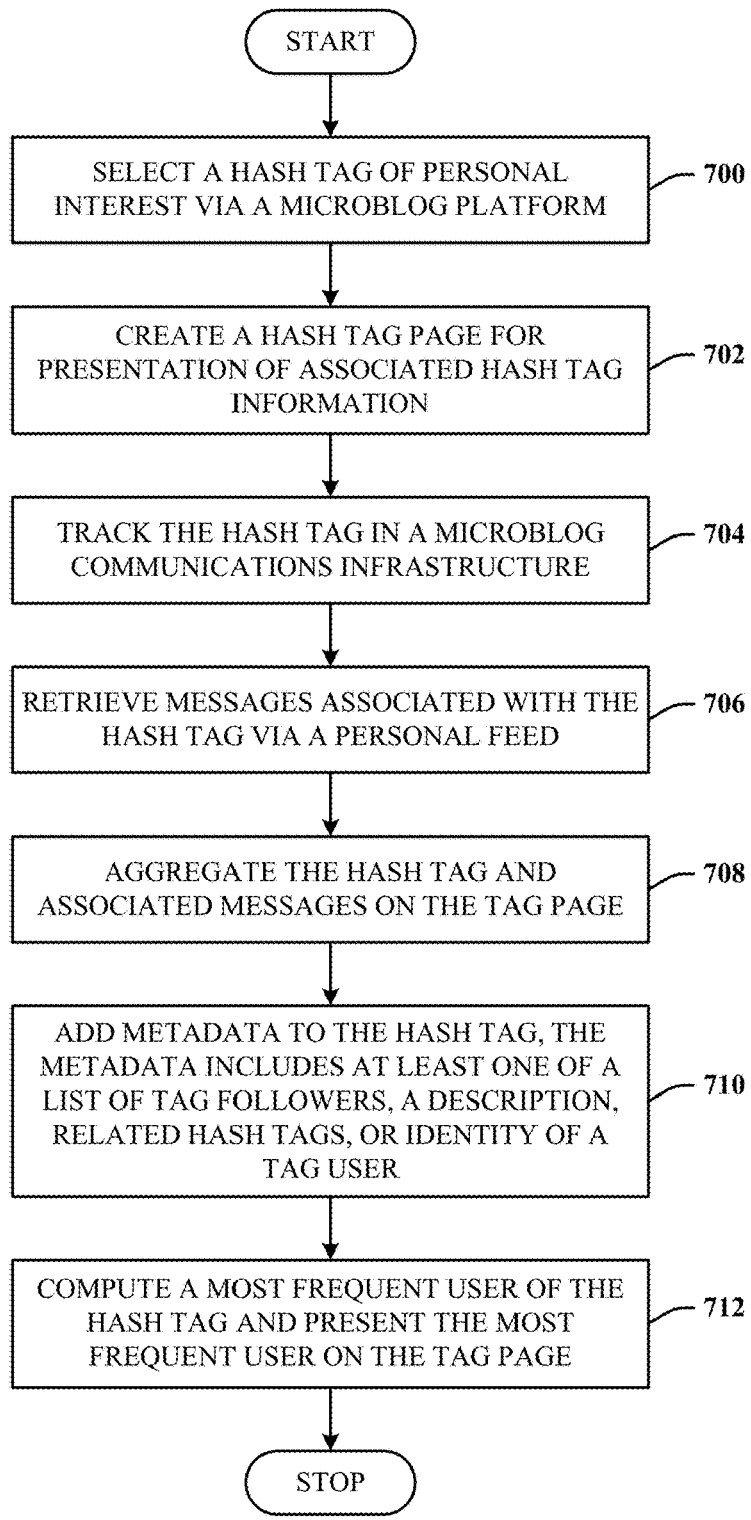
FIG. 7 illustrates an alternative information method.

FIG. 7 illustrates an alternative information method. At 700, a hash tag of personal interest is selected via a microblog platform. At 702, a hash tag page is created for presentation of associated hash tag information. At 704, the hash tag is tracked in a microblog communications infrastructure. At 706, messages associated with the hash tag are retrieved via a personal feed. At 708, the hash tag and associated messages are aggregated on the tag page. At 710, metadata is added to the hash tag, the metadata includes at least one of a list of tag followers, a description, related hash tags, or identity of a tag user. At 712, a most frequent user of the hash tag is computed and the most frequent user is presented on the tag page.

Figure 8:
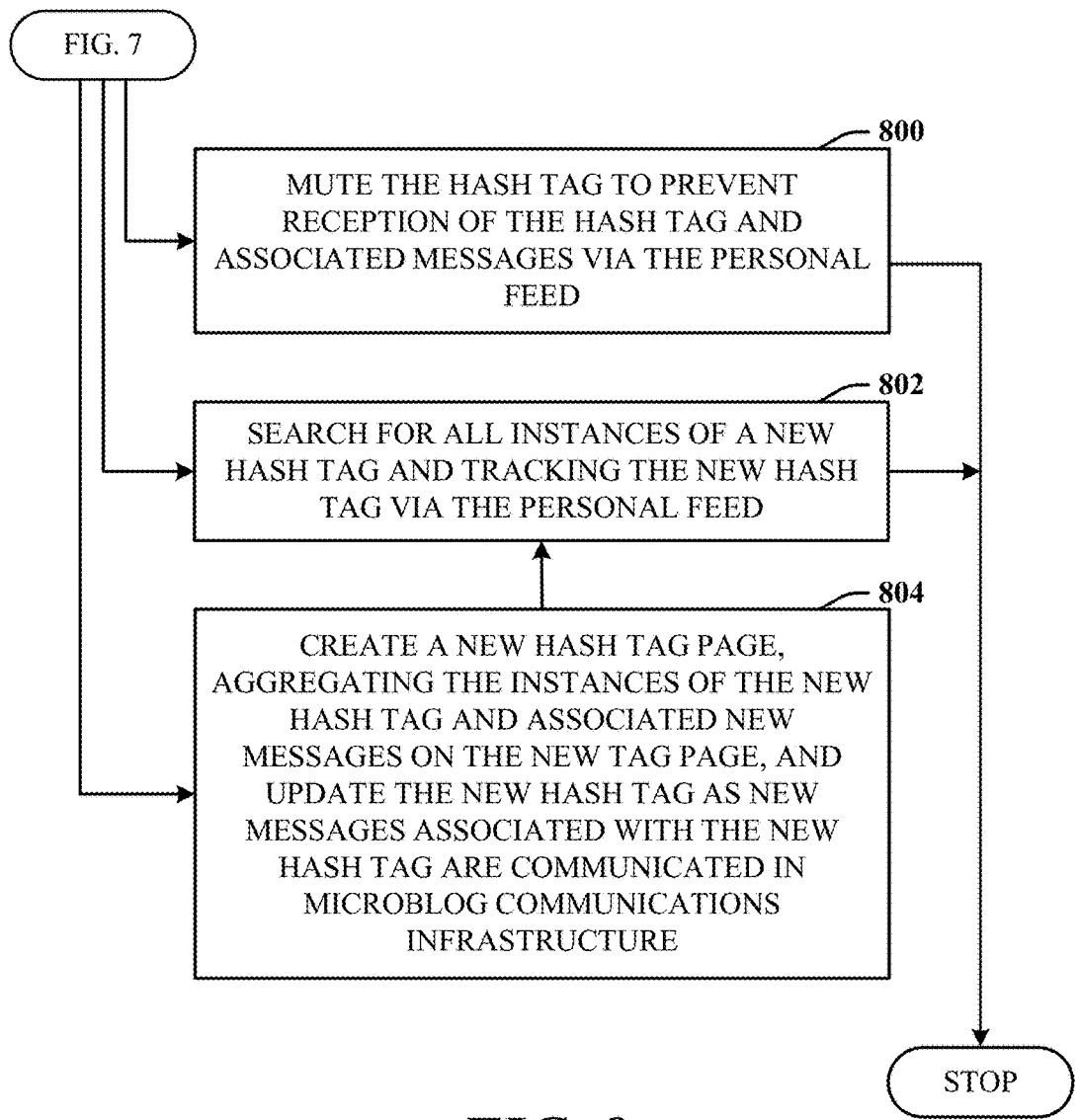
FIG. 8 illustrates further aspects of the method of FIG. 7.

FIG. 8 illustrates further aspects of the method of FIG. 7. Note that the flow indicates that each block can represent a step that can be included, separately or in combination with other blocks, as additional aspects of the method represented by the flow chart of FIG. 7. At 800, the hash tag is muted to prevent reception of the hash tag and associated messages via the personal feed. At 802, for all instances of a new hash tag are searched and the new hash tag is tracked via the personal feed. At 804, a new hash tag page is created, the instances of the new hash tag and associated new messages are aggregated on the new tag page. The new hash tag (and associated new tag page) is updated as new messages associated with the new hash tag are communicated in microblog communications infrastructure.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
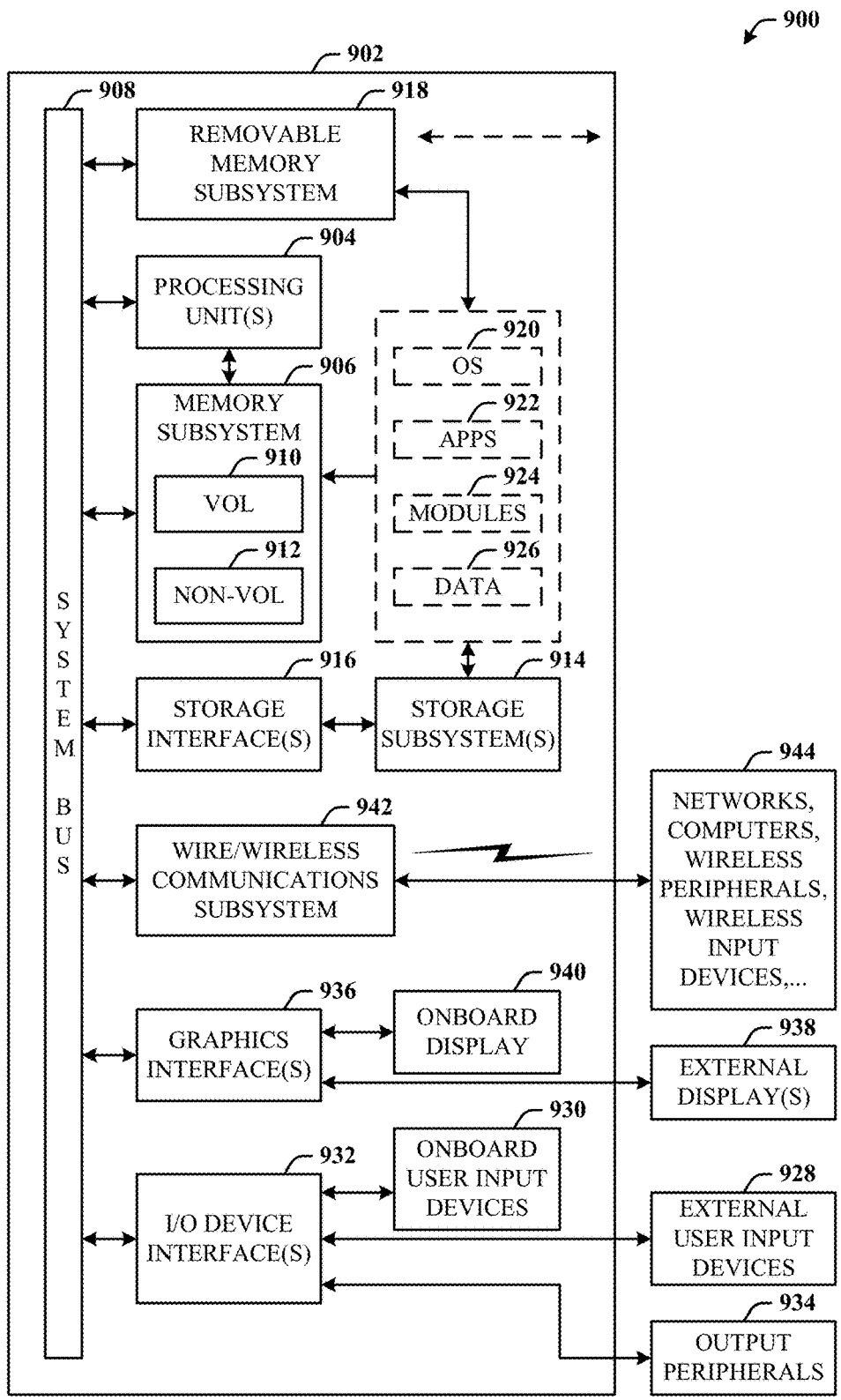
FIG. 9 illustrates a block diagram of a computing system that executes tag telemetry in accordance with the disclosed architecture.

Referring now to FIG. 9, there is illustrated a block diagram of a computing system 900 that executes tag telemetry in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the flow diagram for the information system 200 of FIG. 2, the tag page 300 of FIG. 3, the follow page 400 of FIG. 4, and the methods represented by the flowcharts of FIGS. 5-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   at least one processor; and
   memory storing instructions that, when executed by the at least one processor, cause the system to perform a set of operations, the set of operations comprising:
      providing a hash tag page for a hash tag followed by a user that aggregates one or more microblog messages associated with the hash tag;
      generating a personal feed page of the user, comprising:
         at least one microblog message of another user, wherein the another user is followed by the user; and
         at least one microblog message associated with the hash tag, wherein the at least one microblog message associated with the hash tag is not a microblog message of the another user and is presented on the personal feed with the at least one microblog message of the another user; and adding a new microblog message comprising the hash tag to the personal feed page of the user, wherein selection of the hash tag of the new microblog message accesses an updated hash tag page comprising the new microblog message.

2. The system of claim 1, wherein the hash tag page is accessible using an instance of the hash tag in the microblogging communications infrastructure.

3. The system of claim 1, wherein the hash tag page includes at least one of a list of hash tag followers, a description, one or more related hash tags, or an identity of a tag user.

4. The system of claim 3, wherein the tag user is included on the hash tag page based on usage frequency of the hash tag by the tag user.

5. The system of claim 1, wherein the set of operations further comprises receiving an indication to follow a second hash tag, and wherein the personal feed page further comprises one or more microblog messages associated with the second hash tag.

6. The system of claim 5, wherein the set of operations further comprises:
adding the second hash tag to a list of hash tags currently followed by the user.

7. The system of claim 1, wherein the set of operations further comprises:
receiving an indication to mute the hash tag to prevent reception of microblog messages associated with the hash tag via the personal feed page.

8. The system of claim 1, wherein the set of operations further comprises:
receiving an indication to follow the hash tag based on a mention of the hash tag in the microblogging communications infrastructure.

9. The system of claim 1, wherein the set of operations further comprises:
receiving an indication to search for a second hash tag; and
generating a results page comprising one or more instances of the second hash tag.

10. A computer-implemented method, comprising:
receiving a selection of a hash tag of a microblog communications infrastructure;
generating a personal feed page of a user, wherein the personal feed page comprises:
one or more microblog messages of another user, wherein the another user is followed by the user; and
at least one of the one or more microblog messages relating to the hash tag, wherein the at least one of the one or more microblog messages relating to the hash tag is not a microblog message of the another user and is presented on the personal feed page with the one or more microblog messages of the another user; and
updating the personal feed page of the user with a new microblog message associated with the hash tag, wherein selection of the hash tag in the new microblog message accesses a hash tag page associated with the hash tag.

11. The method of claim 10, further comprising generating a page comprising metadata associated with the hash tag, wherein the metadata includes at least one of a list of hash tag followers, a description, one or more related hash tags, or an identity of a tag user.

12. The method of claim 10, further comprising:
computing a most frequent user of the hash tag; and
presenting the computed most frequent user on the hash tag page associated with the hash tag.

13. The method of claim 10, further comprising:
muting the hash tag to prevent reception of the hash tag via the personal feed page.

14. The method of claim 10, wherein the method further comprises receiving a selection of a second hash tag of the microblog communications infrastructure, and wherein the personal feed page further comprises a microblog message comprising the second hash tag.

15. The method of claim 14, further comprising:
adding, in response to receiving the selection, the second hash tag to a list of hash tags currently followed by the user.

16. The method of claim 10, wherein the hash tag page aggregates one or more microblog messages associated with the hash tag.

17. A computer-implemented method, comprising:
receiving an indication to follow a hash tag by a user in a microblog communications infrastructure;
adding, in response to the indication, the hash tag to a list of hash tags currently followed by the user;
generating a personal feed page for the user comprising at least one microblog message associated with the hash tag followed by the user and at least one microblog message associated with another user followed by the user, wherein the at least one microblog message associated with the hash tag is not a microblog message of the another user and are presented on the personal feed page with the one or more microblog messages associated with the another user;
providing the personal feed page for display to the user; and
updating the personal feed page with a new microblog message comprising the hash tag, wherein selection of the hash tag in the new microblog message accesses a hash tag page associated with the hash tag.

18. The method of claim 17, further comprising:
muting the hash tag to prevent display of microblog messages associated with the hash tag via the personal feed page.

19. The method of claim 17, further comprising:
receiving the indication to follow the hash tag based on a mention of the hash tag in the personal feed page.

20. The method of claim 17, further comprising:
receiving an indication to follow a second hash tag; and
updating the personal feed page with a microblog message comprising the second hash tag, wherein selection of the second hash tag accesses a second hash tag page associated with the second hash tag.

* * * * *